(12) United States Patent
Russomanno et al.

(10) Patent No.: US 12,340,013 B1
(45) Date of Patent: Jun. 24, 2025

(54) GRAPHICAL USER INTERFACE FOR COMPUTER CONTROL THROUGH BIOMETRIC INPUT

(71) Applicant: OpenBCI, Inc., Brooklyn, NY (US)

(72) Inventors: Conor Russomanno, Brooklyn, NY (US); Richard Gaston Waltman, Jr., Hammond, LA (US); Cory Evens, Costa Mesa, CA (US)

(73) Assignee: OpenBCI, Inc., Brooklyn, NY (US)

( * ) Notice: Subject to any disclaimer, the term of this patent is extended or adjusted under 35 U.S.C. 154(b) by 0 days.

(21) Appl. No.: 18/641,247

(22) Filed: Apr. 19, 2024

Related U.S. Application Data

(60) Provisional application No. 63/604,705, filed on Nov. 30, 2023.

(51) Int. Cl.
*G06F 3/01* (2006.01)
*G06F 3/0484* (2022.01)
*G06F 3/04845* (2022.01)
*G06V 40/16* (2022.01)

(52) U.S. Cl.
CPC .............. *G06F 3/011* (2013.01); *G06F 3/015* (2013.01); *G06F 3/016* (2013.01); *G06F 3/0484* (2013.01); *G06F 3/04845* (2013.01); *G06V 40/174* (2022.01)

(58) Field of Classification Search
CPC .......... G06F 3/013; G06F 3/012; G06F 3/015; G06F 3/011; G06F 3/04845; G06F 3/04842; G06F 3/0484; G06F 3/016; G06F 3/017; G06F 2203/011; G06F 3/005; A63F 13/212; A63F 13/213; A63F 13/20; A63F 13/42; G06V 40/174; G06V 40/175; G06V 40/176

See application file for complete search history.

(56) References Cited

U.S. PATENT DOCUMENTS

| | | | | |
|---|---|---|---|---|
| 4,883,067 A | * | 11/1989 | Knispel | A61B 5/375 984/301 |
| 8,300,055 B2 | * | 10/2012 | Niles | G06F 3/04847 715/833 |
| 9,354,702 B2 | * | 5/2016 | Mullins | G06T 19/006 |
| 2001/0009418 A1 | * | 7/2001 | Hiroike | G06F 3/011 345/679 |
| 2003/0158495 A1 | * | 8/2003 | Hogan | A61B 5/6814 600/545 |

(Continued)

FOREIGN PATENT DOCUMENTS

KR 20170026925 A * 3/2017
KR 20180074124 A * 7/2018

*Primary Examiner* — Nicholas Ulrich
(74) *Attorney, Agent, or Firm* — Esplin & Associates, PC (57) ABSTRACT

The biometric characteristics of a user are collected and aggregated for use as inputs to control computing devices, and a neurofeedback system facilitates the user's learning of the computer controls. The biometric characteristics of the user are translated into real-time inputs for computing devices. The neurofeedback system provides visual, audio, and/or haptic feedback on the physical, behavioral, physiological, and/or psychological states of the user. The graphical user interface elements indicate the status of computer controls to the user in real time, providing information on whether or not the user is activating the controls.

22 Claims, 6 Drawing Sheets

(56) References Cited

U.S. PATENT DOCUMENTS

| | | | | |
|---|---|---|---|---|
| 2014/0198035 A1* | 7/2014 | Bailey | ................... | G06F 3/0484 |
| | | | | 345/156 |
| 2014/0210745 A1* | 7/2014 | Chizeck | ................. | G06F 3/015 |
| | | | | 345/173 |
| 2015/0297109 A1* | 10/2015 | Garten | .................... | A61B 5/38 |
| | | | | 600/28 |
| 2015/0313496 A1* | 11/2015 | Connor | ................. | A61B 5/369 |
| | | | | 600/301 |
| 2017/0060256 A1* | 3/2017 | Heck | ...................... | G06F 3/015 |
| 2017/0083086 A1* | 3/2017 | Mazur | ................. | G06F 3/04812 |
| 2017/0115726 A1* | 4/2017 | Fung | .................... | G06V 40/10 |
| 2018/0299947 A1* | 10/2018 | Chang | .................... | G06F 3/011 |
| 2020/0249752 A1* | 8/2020 | Parshionikar | ........... | G06F 3/016 |
| 2021/0019036 A1* | 1/2021 | Wang | .................... | G06F 3/0346 |
| 2021/0223864 A1* | 7/2021 | Forsland | ................ | G06F 3/016 |
| 2021/0259601 A1* | 8/2021 | Kornberg | .............. | G06F 3/0482 |
| 2022/0164029 A1* | 5/2022 | Chin | ................... | A61B 5/7267 |
| 2022/0187912 A1* | 6/2022 | Alcaide | .................. | G06F 21/32 |
| 2022/0261071 A1* | 8/2022 | Ross | ................. | G02B 27/0176 |
| 2023/0190189 A1* | 6/2023 | Ash | ..................... | A61B 5/6803 |
| | | | | 600/545 |

* cited by examiner

GRAPHICAL USER INTERFACE FOR COMPUTER CONTROL THROUGH BIOMETRIC INPUT

FIELD

The present disclosure relates generally to the field of graphical user interfaces for facilitating computer control through biometric input.

BACKGROUND

Non-traditional inputs for computing devices, such as a brain/muscle-computer interface, enables a person to control computing devices without the use of a mouse or a keyboard. Use of such inputs requires new types of feedback to facilitate user learning and/or to provide status of the inputs.

SUMMARY

This disclosure relates to facilitating computer control through biometric input. Biometric information of a person and/or other information may be obtained. The biometric information may define values of a set of biometric characteristics of the person. The set of biometric characteristics may include a first biometric characteristic, a second biometric characteristic different from the first biometric characteristic, and/or other biometric characteristics. The set of biometric characteristics of the person may be mapped to a set of controls. The set of control may include a first control, a second control different from the first control, and/or other controls. The first biometric characteristic may be mapped to the first control. The second biometric characteristic may be mapped to the second control. Activation of the set of controls may be determined based on the values of the set of biometric characteristics and/or other information. Activation of the first control may be determined based on values of the first biometric characteristic and/or other information. Activation of the second control may be determined based on values of the second biometric characteristic and/or other information. A graphical user interface may be presented on an electronic display. The graphical user interface may include visual representations of the set of biometric characteristics, visual representations of the set of controls, and/or other visual representations. The visual representations of the set of biometric characteristics may provide visual feedback on the values of the set of biometric characteristics. The visual representations of the set of controls may provide visual feedback on the activation of the set of controls.

A system for facilitating computer control through biometric input may include one or more electronic storages, one or more processors, one or more electronic displays, and/or other components. An electronic storage may store information relating to a person, biometric information, information relating to biometric characteristics of the person, information relating to controls, information relating to activation of the controls, information relating to a graphical user interface, and/or other information.

The processor(s) may be configured by machine-readable instructions. Executing the machine-readable instructions may cause the processor(s) to facilitate computer control through biometric input. The machine-readable instructions may include one or more computer program components. The computer program components may include one or more of a biometric information component, a map compo-nent, an activation component, a graphical user interface component, and/or other computer program components.

The biometric information component may be configured to obtain biometric information of a person and/or other information. The biometric information may define values of a set of biometric characteristics of the person. The set of biometric characteristics may include a first biometric characteristic, a second biometric characteristic different from the first biometric characteristic, and/or other biometric characteristics.

In some implementations, the set of biometric characteristics of the person may include one or more brain characteristics, one or more muscle characteristics, and/or one or more face characteristics of the person.

The map component may be configured to map the set of biometric characteristics of the person to a set of controls. The set of control may include a first control, a second control different from the first control, and/or other controls. The first biometric characteristic may be mapped to the first control. The second biometric characteristic may be mapped to the second control.

In some implementations, the set of controls may include multiple directional controls. The set of controls may further include one or more selection controls.

The activation component may be configured to determine activation of the set of controls based on the values of the set of biometric characteristics and/or other information. Activation of the first control may be determined based on values of the first biometric characteristic and/or other information. Activation of the second control may be determined based on values of the second biometric characteristic and/or other information.

The graphical user interface component may be configured to present one or more graphical user interfaces on one or more electronic displays. The graphical user interface(s) may include visual representations of the set of biometric characteristics, visual representations of the set of controls, and/or other visual representations. The visual representations of the set of biometric characteristics may provide visual feedback on the values of the set of biometric characteristics. The visual representations of the set of controls may provide visual feedback on the activation of the set of controls.

The visual representations of the set of controls may include one or more interface elements. In some implementations, the visual representations of the set of controls may include a forward element, a backward element, an upward element, a downward element, a right-strafe element, a left-strafe element, a right-rotate element, and/or a left-rotate element. In some implementations, the visual representations of the set of controls may include an up element, a down element, a right element, a left element, a right-up element, a right-down element, a left-up element, a left-down element, and/or a selection element.

In some implementations, one or more changes in the visual representations of the set of controls may provide the visual feedback on the activation of the set of controls. The change(s) in the visual representations of the set of controls may include change(s) in color, glow, opacity, shape, size, and/or symbol of the visual representations of the set of controls.

In some implementations, the graphical user interface(s) may further include one or more objects. The visual representations of the set of controls may include translations and/or rotations of the object(s).

In some implementations, audio feedback and/or haptic feedback on the values of the set of biometric characteristics and/or the activation of the set of controls may be provided. The frequency of the visual feedback, the audio feedback, and/or the haptic feedback for a given biometric characteristic may be determined based on the frequency of the given biometric characteristic and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to facilitating computer control through biometric input. The biometric characteristics of a user are collected and aggregated for use as inputs to control computing devices, and a neurofeedback system facilitates the user's learning of the computer controls. The biometric characteristics of the user are translated into real-time inputs for computing devices. The neurofeedback system provides visual, audio, and/or haptic feedback on the physical, behavioral, physiological, and/or psychological states of the user. The graphical user interface elements indicate the status of computer controls to the user in real time, providing information on whether or not the user is activating the controls.

Figure 1:
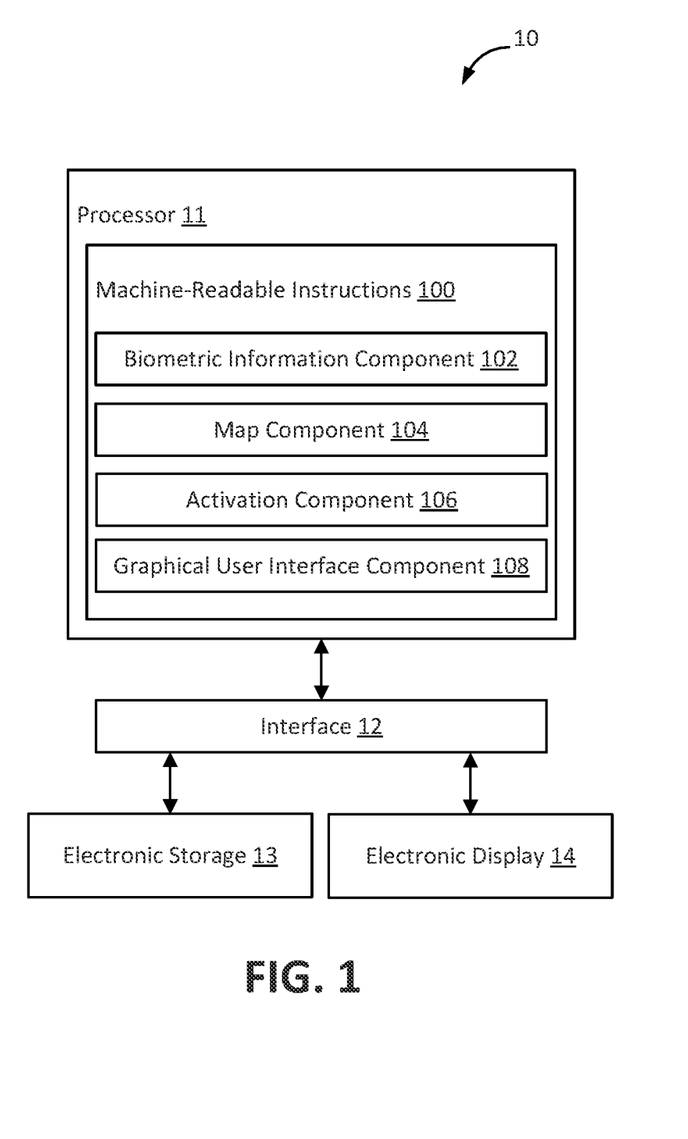
FIG. 1 illustrates an example system for facilitating computer control through biometric input.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, an electronic display 14, and/or other components. Biometric information of a person and/or other information may be obtained by the processor 11. The biometric information may define values of a set of biometric characteristics of the person. The set of biometric characteristics may include a first biometric characteristic, a second biometric characteristic different from the first biometric characteristic, and/or other biometric characteristics. The set of biometric characteristics of the person may be mapped by the processor 11 to a set of controls. The set of controls may include a first control, a second control different from the first control, and/or other controls. The first biometric characteristic may be mapped to the first control. The second biometric characteristic may be mapped to the second control. Activation of the set of controls may be determined based on the values of the set of biometric characteristics and/or other information. Activation of the first control may be determined by the processor 11 based on values of the first biometric characteristic and/or other information. Activation of the second control may be determined based on values of the second biometric characteristic and/or other information. A graphical user interface may be presented by the processor 11 on an electronic display. The graphical user interface may include visual representations of the set of biometric characteristics, visual representations of the set of controls, and/or other visual representations. The visual representations of the set of biometric characteristics may provide visual feedback on the values of the set of biometric characteristics. The visual representations of the set of controls may provide visual feedback on the activation of the set of controls.

The electronic storage 13 may include one or more electronic storage media that electronically stores information. The electronic storage 13 may store software algorithms, information determined by the processor 11, information received remotely, and/or other information that enables the system 10 to function properly. For example, the electronic storage 13 may store information relating to a person, biometric information, information relating to biometric characteristics of the person, information relating to controls, information relating to activation of the controls, information relating to a graphical user interface, and/or other information.

The electronic display 14 may refer to an electronic device that provides visual presentation of information. The electronic display 14 may include a color display and/or a non-color display. The electronic display 14 may be configured to visually present information. The electronic display 14 may present information using/within one or more graphical user interfaces. For example, the electronic display 14 may present information relating to a person, biometric information, information relating to biometric characteristics of the person, information relating to controls, information relating to activation of the controls, information relating to the graphical user interface(s), and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate computer control through biometric input. The machine-readable instructions 100 may include one or more computer program components. The machine-readable instructions 100 may include a biometric information component 102, a map component 104, an activation component 106, a graphical user interface component 108, and/or other computer program components. While the functionalities of the processor 11 are described with respect to computer program components, the functionalities of the present disclosure may be implemented through hardware, implemented through software, or implemented through hardware and software.

The biometric information component 102 may be configured to obtain biometric information of a person and/or other information. Obtaining biometric information may include one or more of accessing, acquiring, analyzing, determining, examining, generating, identifying, loading, locating, measuring, opening, receiving, retrieving, reviewing, selecting, storing, and/or otherwise obtaining the biometric information. The biometric information component 102 may obtain biometric information from one or more locations. For example, the biometric information component 102 may obtain biometric information from a storage location, such as the electronic storage 13, electronic storage of a device accessible via a network, and/or other locations. The biometric information component 102 may obtain biometric information from one or more hardware components (e.g., a computing device, a sensor) and/or one or more software components (e.g., software running on a computing device).

The biometric information of a person may define values of a set of biometric characteristics of the person. A set of biometric characteristics may include one or more biometric characteristics. A set of biometric characteristics may include different biometric characteristics. For example, a set of biometric characteristics may include a first biometric characteristic, a second biometric characteristic different from the first biometric characteristic, and/or other biometric characteristics. A value of a biometric characteristic may refer to quantity and/or quality of the biometric characteristic. A value of a biometric characteristic may refer to a numerical value and/or a categorical value that reflects the amount and/or the state of the biometric characteristic. A value of a biometric characteristic may include a binary value (e.g., yes/no, true/false) or a range of values (e.g., between zero and one, between zero and one hundred).

A biometric characteristic of a person may be measured by one or more sensors from the person's body (e.g., from the skin, blood flow, muscles), from materials on the person's body (e.g., sweat on the skin), and/or away from the person's body (e.g., image sensor capturing images of the person, sound sensor capturing sound produced by the person). The sensors may output signals (e.g., electrical signals, voltage signals, current signals, optical signals) that convey, reflect, and/or otherwise indicate values of the measured biometric characteristic(s). Example types of sensors may include photoplethysmography (PPG) sensor, electroencephalography (EEG) sensor, electromyography (EMG) sensor, electrodermal activity (EDA) sensor, electrooculogram (EOG) sensor, functional near-infrared spectroscopy (fNIRS) sensor, motion sensor (e.g., accelerometer, inertial measurement unit, gyroscope), image sensor (e.g., camera), sound sensor (e.g., microphone), and/or temperature sensor. Other types of sensors are contemplated.

A biometric characteristic of a person may refer to a physical and/or behavioral characteristic of the person, such as expressions, gestures, actions, and/or sounds made by the person. A biometric characteristic of a person may refer to physiological characteristic of the person, such as a characteristic relating to the person's bodily functions (e.g., heart rate, skin conductance, skin temperature, cortisol level, palmar sweat, and/or eye tracking). For example, a set of biometric characteristics of the person may include one or more brain characteristics (e.g., signals measured from the person's head/brain), one or more muscle characteristics (e.g., signals measured from the person's skeletal muscles), and/or one or more face characteristics of the person (e.g., facial expressions made by the person). Other types of biometric characteristics are contemplated.

The values of a biometric characteristic of a person may be determined from signals measured by a single sensor or from signals measured by multiple sensors. For example, the values of a biometric characteristic may be determined from and/or reflect the amplitude, energy, frequency, intensity, and/or power of the signal measured by a sensor (e.g., voltage reading from an EEG sensor). As another example, the values of a biometric characteristic may be determined from information measured by multiple sensors. For instance, the type of facial expression being made by the person may be determined based on one or more images of the person's head (e.g., the entire head; a portion of the head, such as the eyes of the person) captured by image sensor(s) and the signals measured from one or more facial muscles.

Use of both images and signals measured from the person's facial muscles may enable more accurate determination of the types of facial expressions being made by the person. Use of both images and signals measured from the person's facial muscles may enable more accurate determination of the extent of the facial expressions being made by the person. For example, information from an image-based eye-tracking system with muscle data (e.g., EMG) from the face and/or scalp may enable more accurate isolation/differentiation of individual expressions, as well as more accurate determination/quantification the amount/degree by which the person is making the facial expression. For instance, in addition to improving detection of whether the person is or is not raising a particular brow, use of both images and signals measured from the person's facial muscles may enable more accurate determination of how much the brow is being raised/how much the person is attempting to raise the brow (e.g., as reflected in a range, with zero indicating the brow not being raised and one/one-hundred indicting the maximum amount by which the brow is being raised).

The biometric information may define the values of a biometric characteristic of the person by including information that characterizes, conveys, describes, delineates, identifies, is associated with, quantifies, reflects, sets forth, and/or otherwise defines one or more of value, property, quality, quantity, attribute, feature, and/or other aspects of the biometric characteristic of the person/the values of the biometric characteristic of the person. The biometric information may directly and/or indirectly define the values of a biometric characteristic of the person. For example, the biometric information may include information that specifies the type and the value of the biometric characteristic and/or information that may be used to determine the value of the biometric characteristic. Other types of biometric information are contemplated.

The map component 104 may be configured to map the set of biometric characteristics of the person to a set of controls. Mapping a biometric characteristic to a control may include assigning, associating, connecting, equating, linking, relating, and/or otherwise mapping the biometric characteristic to the control. A set of controls may include one or more controls. A set of controls may include different controls. For example, a set of controls may include a first control, a second control different from the first control, and/or other controls. Different biometric characteristics may be mapped to different controls. A single biometric characteristic or a combination of biometric characteristics may be mapped to a single control. For example, the first biometric characteristic may be mapped to the first control, and the second biometric characteristic may be mapped to the second control. Other mapping of biometric characteristics to controls is contemplated.

Biometric characteristics may be mapping to controls based on defaults, user-input, and/or information. For example, specific mapping between various biometric characteristics and controls may be preset for a particular use case, a particular user (person), and/or a particular scenario, and the mapping may be performed based on current/contemplated conditions. One or more users may be able to make arbitrary assignments of particular biometric characteristics to particular controls.

A control may refer to an input and/or a mechanism used to control operation of a computer system/computing device. A control may refer to an input and/or a mechanism used to control operation of hardware, software, and/or a combination thereof. A control may refer to information provided to hardware, software, and/or a combination thereof for processing in regulating, guiding, and/or otherwise controlling hardware/software operation. A control may determine the behavior of one or more physical objects and/or one or more virtual objects. A control may determine how physical object(s) and/or virtual object(s) move, interact with other object(s), and/or operate.

For example, a set of controls may include controls on a keyboard, a keypad, a mouse, a game controller, a gamepad, a joystick, and/or other hardware and/or software user interface devices. For instance, a set of controls may include multiple directional controls. A directional control may refer to a control that impacts the direction of an object. A directional control may impact the direction in which the object moves and/or is directed/pointed. For example, a directional control may include control of the direction of the object in two-dimensions (e.g., up, down, left, right, combination thereof), in three-dimensions (e.g., up, down, left, right, forward, backward, pitch, tilt, roll, combination thereof), and/or in other dimensions. The set of controls may further include one or more selection controls. A selection control may refer to a control that impacts the selection of an object (e.g., a physical object, a virtual object, a menu option, a button press/trigger). A selection control may impact which and/or how much an object is selected. For example, a selection control may include control of button press/trigger (e.g., press/trigger of a button or a combination of buttons). Other types of controls are contemplated.

For example, different types of facial expressions and/or different muscles may be mapped to different directional controls and selection controls. A person may make different facial expressions and/or control/relax different muscles to control how an object (e.g., a physical vehicle, a software cursor) moves and/or interacts with other objects (e.g., physical/virtual environment, physical/virtual objects). A person may make different facial expressions and/or control/relax different muscles to control operation of the object (e.g., operate devices carried by the physical vehicle, such as a camera or a payload; cause a left/right click or a button press in the location of the software cursor). Other mappings of biometric characteristics to controls are contemplated.

The activation component 106 may be configured to determine activation of the set of controls. Determining activation of a control may include ascertaining, approximating, calculating, detecting, determining, discerning, discovering, establishing, estimating, finding, identifying, obtaining, quantifying, setting, and/or otherwise determining activation of the control. Activation of a control may include the action or the process of making the control active or operative. Determining activation of a control may include determining that the control has been activated and/or determining the amount by which the control has been activated. For example, determining activation of a control (e.g., up control, button press) may include determining whether or not the control has been made active (e.g., object is to be moved up or not, button is to be pressed or not) and/or by how much the control has been made active (e.g., the speed with which the object is to be moved up, how much the button is to be pressed).

Activation of the set of controls may be determined based on the values of the set of biometric characteristics and/or other information. Activation of a given control may be determined based on the values of the biometric characteristic(s) mapped to the given control and/or other information. For example, activation of the first control may be determined based on values of the first biometric characteristic mapped to the first control and/or other information. Activation of the second control may be determined based on values of the second biometric characteristic mapped to the second control and/or other information. The person may activate a control by controlling/changing the biometric characteristic(s) mapped to the control. Determining activation of a control may include interpreting the mapped biometric characteristic(s) of the person into the control/one or more commands associated with the control.

In some implementations, a control may be determined to be activated based on the values of the mapped biometric characteristic(s) matching one or more certain values. For example, a particular facial expression (e.g., right brow raise) may be mapped to a control, and the control may be determined to be activated based on detection that the person has made the facial expression (e.g., right brow raised=true).

In some implementations, a control may be determined to be activated based on the values of the mapped biometric characteristic(s) satisfying (e.g., reaching, being greater than, being smaller than) one or more threshold values. For example, a particular facial expression (e.g., right brow raise) may be mapped to a control, and the control may be determined to be activated based on detection that the person has made the facial expression of sufficient amount (e.g., right brow raised by a certain amount).

In some implementations, a control may be determined to be activated based the values of the mapped biometric characteristic(s) matching certain value(s) and/or satisfying threshold value(s) for a certain duration of time. For example, the person may need to make a particular facial expression for a certain duration of time before the control is activated.

In some implementations, the amount or the degree with which the control is activated may be determined based on the values of the biometric characteristic(s) mapped to the control and/or other information. For example, greater values of the mapped biometric characteristic(s) may result in greater amount/degree of control activation (e.g., higher brow raise result in faster speed of movement/greater button press) while smaller values of the mapped biometric characteristic(s) may result in smaller amount/degree of control activation ((e.g., lower brow raise result in slower speed of movement/smaller button press)). As another example, greater values of the mapped biometric characteristic(s) may result in smaller amount/degree of control activation while smaller values of the mapped biometric characteristic(s) may result in greater amount/degree of control activation. Thus, the biometric characteristic(s) of the person may be used to determine both when the mapped control is activated/not activated, and the amount/degree by which the mapped control is activated.

In some implementations, the values of the biometric characteristic(s) may be normalized (e.g., between 0 and 1, between 0 and 100). In some implementations, the sensitivity of the controls may be manually and/or automatically adjusted for the person. For example, the thresholds that are used for activation of the controls and/or conversion of the values of the biometric characteristic(s) to amounts/degrees of control activation may be adjusted to enable for the user to have a full range of controls. The sensitivity adjustment may include an upper bound and/or a lower bound to reduce false positives and/or negatives in control activation.

The graphical user interface component 108 may be configured to present one or more graphical user interfaces on one or more electronic displays (e.g., the electronic display 14). Presenting a graphical user interface on an electronic display may include causing presentation of, bringing about presentation of, displaying, effectuating presentation of, facilitating presentation of, showing, and/or otherwise presenting the graphical user interface on the electronic display. A graphical user interface may refer to a user interface that provides information to a user (a person) and/or enables a user to interact with the system 10 through one or more interface elements of the graphical user interface. A graphical user interface may include a static configuration of interface elements and/or dynamic configurations of interface elements that changes (e.g., with time, based on values of biometric characteristics, based on user interaction). Multiple/different interface elements may be presented/included within a graphical user interface at the same time, may be presented/included within a graphical user interface at different times, and/or may be presented/ included within a graphical user interface responsive to user interaction with one or more other interface elements, changes in values of biometric characteristics, and/or other information.

A graphical user interface may include one or more interface elements. An interface element may refer to a graphical element of the graphical user interface, such as window, icon, button, graphic, and/or other visual indicator. An interface element may visually provide information and/or enable/facilitate a user to provide inputs to the system 10. For example, an interface element may visually provide information determined by the system 10 and/or information on biometric characteristics of the user. A graphical user interface may present information on what controls have been activated, how much the controls have been activated, and/or other information relating to the controls. A graphical user interface may present information on the values of the biometric characteristics of the user, changes in the values of the biometric characteristics of the user, and/or other information relating to the biometric characteristics of the user. A graphical user interface may present information on the hardware/software being operated through/via the controls.

A graphical user interface may include visual representations of the set of biometric characteristics, visual representations of the set of controls, and/or other visual representations. A visual representation of a biometric characteristic may visually convey information about the biometric characteristic, such as the type and/or the values (e.g., past values, current value) of the biometric characteristic. A visual representation of a biometric characteristic may include one or more interface elements. The visual representations of the set of biometric characteristics may provide visual feedback on the values of the set of biometric characteristics. The visual representations of the set of biometric characteristics may visually provide information about the values of the set of biometric characteristics. As the values of a biometric characteristic changes, the corresponding visual representation may change to show the changes in the values of the biometric characteristic. The visual feedback may be provided before, during, and/or after the activation of a control corresponding to the biometric characteristic.

A visual representation of a control may visually convey information about the control, such as activation/non-activation of the control and/or the amount/degree by which the control is activated. A visual representation of a control may include one or more interface elements. The visual representations of the set of controls may provide visual feedback on the activation of the set of controls. The visual representations of the set of controls may visually provide information on whether or not individual controls have been activated and/or to what amount/degree the individual controls have been activated. As the activation of a control changes (in activation/non-activation; in amount/degree), the corresponding visual representation may change to show the changes in the control activation. The visual feedback may be provided before, during, and/or after the activation of a control.

The visual representations of the set of controls may include one or more interface elements. In some implementations, the visual representations of the set of controls may include a forward element, a backward element, an upward element, a downward element, a right-strafe element, a left-strafe element, a right-rotate element, and/or a left-rotate element. The forward element may visually provide information on activation/non-activation and/or the amount/degree of activation of a control to move forward. The backward element may visually provide information on activation/non-activation and/or the amount/degree of activation of a control to move backward. The upward element may visually provide information on activation/non-activation and/or the amount/degree of activation of a control to move upward. The downward element may visually provide information on activation/non-activation and/or the amount/ degree of activation of a control to move downward. The right-strafe element may visually provide information on activation/non-activation and/or the amount/degree of activation of a control to move laterally to the right. The left-strafe element may visually provide information on activation/non-activation and/or the amount/degree of activation of a control to move laterally to the left. The right-rotate element may visually provide information on activation/non-activation and/or the amount/degree of activation of a control to rotate to the right. The left-rotation element may visually provide information on activation/non-activation and/or the amount/degree of activation of a control to rotate to the left.

In some implementations, the visual representations of the set of controls may further include an up-pitch element and a down-pitch element. The up-pitch element may visually provide information on activation/non-activation and/or the amount/degree of activation of a control to pitch upward. The down-pitch element may visually provide information on activation/non-activation and/or the amount/degree of activation of a control to pitch downward.

Such visual representations may be provided for control of an object (e.g., character, cursor, device, pointer, thing, vehicle) that moves in 3D space (e.g., in the real world, in a virtual world). Such visual representations may provide information on rotational movement (e.g., yaw, pitch, roll) and/or translational movement (e.g., forward, backward, upward, downward, lateral right, lateral left) of the object. Such visual representations may be used to provide visual feedback on control of an object with eight degrees of freedom. Use of other interface elements/movement controls are contemplated.

Figure 3:
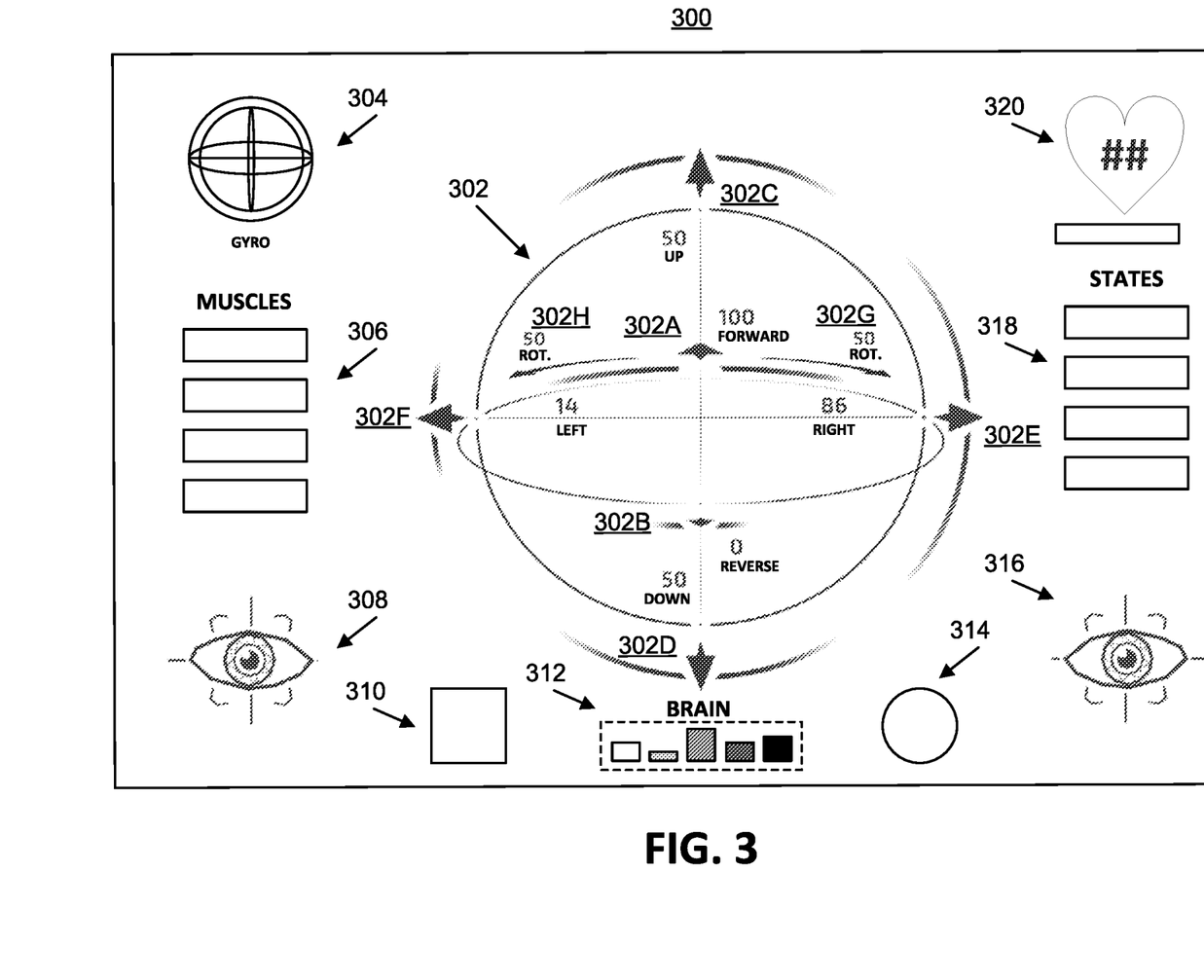
FIG. 3 illustrates an example graphical user interface.

For example, FIG. 3 illustrates an example graphical user interface 300. The graphical user interface 300 may be used in controlling/providing feedback on control of an object, such as a vehicle. For instance, the graphical user interface 300 may be used in a heads-up display for piloting a vehicle (e.g., real vehicle, virtual vehicle) with real-time biometric (e.g., physical, behavioral, physiological, and/or psychological) feedback. In some implementations, the graphical user interface 300 may be presented as an overlay on top of a camera feed from the vehicle. The graphical user interface 300 may be presented on an AR or VR headset, a 2D electronic display, and/or other types of electronic display. The graphical user interface 300 may provide real-time interaction and cognitive state neurofeedback based on biometric characteristic sensing for computer control. The graphical user interface 300 may facilitate the user's usage/learning of biometric characteristics for computer control and enable the user to quickly determine whether correct controls have been activated.

The view of the graphical user interface 300 in FIG. 3 is provided merely as an example, and the arrangement and visual aspects of the graphical user interface may vary depending on the implementation. In some implementations, the graphical user interface may include additional features and/or alternative features. In some implementations, the graphical user interface may not include features shown in FIG. 3. Other graphical user interfaces are contemplated.

The graphical user interface 300 may include a directional control feedback element 302. The directional control feedback element 302 may visually provide information on activation of directional controls. The directional control feedback element 302 may include a forward element 302A, a backward element 302B, an upward element 302C, a downward element 302D, a right-strafe element 302E, a left-strafe element 302F, a right-rotate element 302G, and/or a left-rotate element 302H. The directional control feedback element 302 may be translucent and enable the user to see through it.

The directional control feedback element 302 may include values, characters, and/or other text that provide information on activation of different directional controls. For example, the directional control feedback element 302 may include numbers that show whether and/or to what amount/degree different directional controls have been activated. For instance, in FIG. 3, the forward element 302A, the backward element 302B, the upward element 302C, the downward element 302D, the right-strafe element 302E, the left-strafe element 302F, the right-rotate element 302G, and the left-rotate element 302H may be accompanied by a numerical value that indicates whether and to what amount/degree the corresponding directional controls have been activated. In FIG. 3, the numerical values may range between 0 and 100. Opposing directional controls may be paired (e.g., forward and backward; upward and downward; right-strafe and left-strafe element; right-rotate and left-rotate element). When either of the opposing directional controls have not been activated/when the opposing directional controls are balanced, the value of 50 may be shown for the paired controls. When one directional control is activated, the amount by which the directional control is activated may be shown via increase in the value shown for the directional control, along with decrease in the value shown for the opposing directional control.

The graphical user interface 300 may include a gyroscope element 304. The gyroscope element 304 may visually provide information on orientation (e.g., with respect to ground), attitude, and/or heading of the object being controlled. The gyroscope element 304 may include a visual representation of the object in different positions to indicate the orientation, the attitude, and/or the heading of the object. The gyroscope element may include numerical/textual representation of the orientation, the attitude, and/or the heading of the object.

The graphical user interface 300 may include a biometric characteristic element 306. The biometric characteristic element 306 may visually provide information on biometric characteristics that are being used as input to control the object. The biometric characteristic element 306 may visually provide raw or filtered data in a time series format of the biometric characteristics that are mapped to various controls. For example, the biometric characteristic element 306 may include graphs, plots, curves, bars, and/or other visual representation of the values of the biometric characteristics. For instance, the biometric characteristic element 306 may show EMG sensor outputs of four muscles mapped to directional controls. Information on other numbers and/or other types of biometric characteristics may be provided by the biometric characteristic element 306.

The graphical user interface 300 may include a left eye element 308 and a right eye element 316. The left eye element 308 and the right eye element 316 may visually provide information on corresponding eyes of the user. For example, the left eye element 308 and the right eye element 316 may include visual representations of the corresponding eyes in different states, such as whether the eye is opened/closed, whether the user is blinking or squinting, the size of the user's pupils, and/or the direction in which the iris is pointing. The visual representations of the eyes may match the changes in the person's eyes.

The graphical user interface 300 may include an altitude element 310. The altitude element 310 may visually provide information on altitude, elevation, and/or height of the object being controlled. The altitude element 310 may include visual, numerical, and/or textual representation of the object's altitude, elevation, and/or height. The altitude element 310 may include visual, numerical, and/or textual representation of whether the object is moving upwards or downwards. The altitude element 310 may include visual, numerical, and/or textual representation of whether the object is taking off or landing.

The graphical user interface 300 may include a brain wave element 312. The brain wave element 312 may visually provide information on one or more brain waves measured from the user. The brain wave element 312 may visually provide raw or filtered data in a time series format of the user's brain wave(s). For example, the brain wave element 312 may include graphs, plots, curves, bars, and/or other visual representation of the values (e.g., amplitude, energy, frequency, intensity, and/or power) of brain waves in one or multiple EEG sensor channels. For instance, the brain wave element 312 may show EEG sensor output, along with bars for delta, theta, alpha, beta, and gamma waves. The bars may change in size to reflect the powers of delta, theta, alpha, beta, and gamma waves (the size of a bar indicating the power in the corresponding frequency band).

The graphical user interface 300 may include an object state element 314. The object state element 314 may visually provide information on states (e.g., status) of the object being controlled. The object state element 314 may include visual, numerical, and/or textual representation of the object's states (e.g., on/off, active/inactive, in flight/landed).

The graphical user interface 300 may include a user state element 318. The user state element 318 may visually provide information on states (e.g., status, cognitive states, emotional states, psychological states) of the user. The states of the user may be determined based on one or more biometric characteristics of the user. The states of the user may be determined based on the values of the biometric characteristic(s) of the user. The user state element 318 may include visual, numerical, and/or textual representation of the user's states. For instance, the user state element 318 may show plots of the user's stress, arousal, fatigue, and focus levels. Information on other numbers and/or other states of the user may be provided by the user state element 318.

The graphical user interface 300 may include a heart rate element 320. The heart rate element 320 may visually provide information on the heart rates of the user. The heart rate element 320 may include visual, numerical, and/or textual representation of the user's heart rates. For example, the heart rate element 320 may show a heart with the real-time value of the user's heart rate (BPM value). When the user's heart beats, the heart of the heart rate element 320 may swell in size to visualize the heart beats. The heart rate element 320 may include a plot of the user's ECG/EKG and/or PPG data over a period of time (e.g., past five seconds).

The graphical user interface 300 may include other elements. For example, the graphical user interface 300 may include one or more selection elements, Different selection elements may correspond to selection of different objects (e.g., press/trigger of different buttons).

In some implementations, the visual representations of the set of controls may include an up element, a down element, a right element, a left element, a right-up element, a right-down element, a left-up element, a left-down element, and/or one or more selection elements. The up element may visually provide information on activation/non-activation and/or the amount/degree of activation of a control to move up. The down element may visually provide information on activation/non-activation and/or the amount/degree of activation of a control to move down. The right element may visually provide information on activation/non-activation and/or the amount/degree of activation of a control to move to the right. The left element may visually provide information on activation/non-activation and/or the amount/degree of activation of a control to move to the left. The right-up element may visually provide information on activation/non-activation and/or the amount/degree of activation of a control to move up and to the right. The right-down element may visually provide information on activation/non-activation and/or the amount/degree of activation of a control to move down and to the right. The left-up element may visually provide information on activation/non-activation and/or the amount/degree of activation of a control to move up and to the left. The left-down element may visually provide information on activation/non-activation and/or the amount/degree of activation of a control to move down and to the left. The selection element(s) may visually provide information on activation/non-activation and/or the amount/degree of activation of a control to select an object.

Such visual representations may be provided for control of an object (e.g., character, cursor, device, pointer, thing, vehicle) that moves in space (e.g., in the real world, in a virtual world). Such visual representations may be used to provide visual feedback on control of an object with eight degrees of freedom. Use of other interface elements/movement controls are contemplated.

Figure 4:
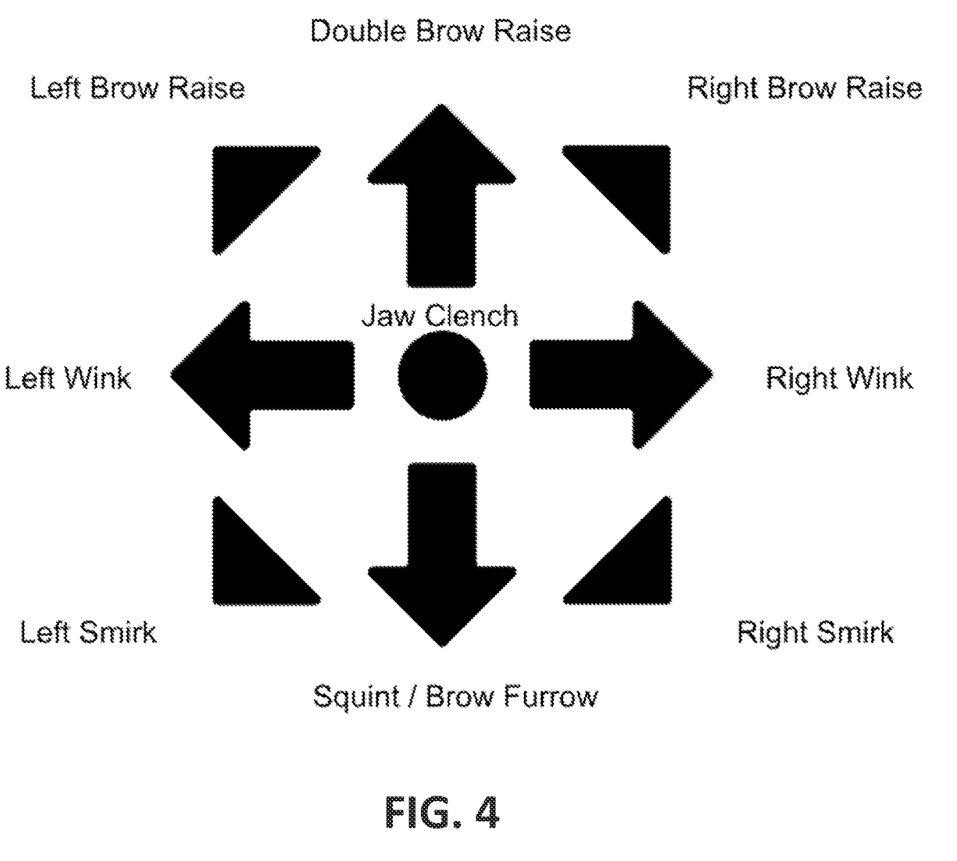
FIG. 4 illustrates an example mapping of facial expressions to a set of controls.

One or more mapping schemes may be used to map the biometric characteristics to the controls. FIG. 4 illustrates an example mapping of facial expressions to a set of controls. While FIG. 4 shows mapping of particular facial expressions to different controls, this is merely as an example and is not meant to be limiting. Other facial expressions and/or other biometric characteristics may be mapped to controls.

In FIG. 4, different facial expressions may be mapped into different buttons/analog actuators. Different facial expressions may provide a binary control (e.g., on/off) or a range of controls (e.g., amount of expression corresponding to amount of button press). Different physical locations of a face may be mapped to the corresponding region of a virtual controller.

For instance, both brows being raised may be mapped to an up control. Squinting/both brows being furrowed may be mapped to a down control. Additionally or alternatively, smiling may be mapped to a down control. A left eye wink may be mapped to a left control. A right eye wink may be mapped to a right control. A left brow being raised may be mapped to a diagonal up-left control. A right brow being raised may be mapped to a diagonal up-right control. A left cheek smirk may be mapped to a diagonal down-left control. A right cheek smirk may be mapped to a diagonal down-right control. A jaw clench may be mapped to a selection control (e.g., button click). Additionally or alternatively, a hard blink of both eyes or both eyes being opened wide (without raising eyebrows) may be mapped to a selection control. While a single selection control mapping is shown in FIG. 4, different facial expressions/biometric characteristics may be mapped to different selection controls. Other mappings of facial expressions/biometric characteristics to controls are contemplated.

In some implementations, one or more changes in the visual representations of the set of controls may provide the visual feedback on the activation of the set of controls. The change(s) in the visual representations of the set of controls may include change(s) in color, glow, opacity, shape, size, and/or symbol of the visual representations of the set of controls. For example, a visual representation of a control may change to indicate changes in activation/non-activation of the control. A visual representation of a control may change to indicate changes in the amount/degree of the control activation. The changes in the visual representations may show the user that the correct controls are being used.

For example, referring to FIG. 3, based on a control to move upward being activated, the upward element 302C may be changed. For instance, the upward element 302 may glow in different color, brightness/intensity, and/or opacity. The upward element 302 may change in size to reflect changes in the amount/degree of control to move upward (e.g., grow in size when the amount/degree is being increased, decrease in size when the amount/degree is being decreased).

The forward element 302A, the backward element 302B, the upward element 302C, the downward element 302D, the right-strafe element 302E, the left-strafe element 302F, the right-rotate element 302G, and the left-rotate element 302H may be accompanied by bar elements (e.g., circular bar elements) that changes in one or more visual characteristics to show activation of the corresponding controls. For example, in FIG. 3, the control to move forward may be activated. The activation of the control to move forward may be shown via change in color/glow and increase in length of the bar elements near the forward element 302A, along with decrease in length of the bar elements near the backward element 302B. In FIG. 3, the control to move to the right may be activated. The activation of the control to move to the right may be shown via change in color/glow and increase in length of the bar elements near the right-strafe element 302E, along with decrease in length of the bar elements near the left-strafe element 302F. Other changes in the visual representations of the set of controls are contemplated.

In some implementations, the graphical user interface(s) may further include one or more objects. The visual representations of the set of controls may include translations and/or rotations of the object(s). Whether and/or how much the control is being activated may be visually represented by translational and/or rotational movement of the object(s). For example, when a person makes a facial expression (e.g., both brow raise, squint/brow furrow, left wink, right wink) corresponding to a movement control, an object (e.g., 2D shape, 3D shape) may be moved or rotated in the direction corresponding to the movement control (e.g., up, down, left, right). The speed with which the object is moved/rotated may depend on how much the person is making/attempting to make the facial expression. The gamification feedback system of visually representing different facial expressions with object movement/rotation may help the person learn to make the different facial expressions.

In some implementations, the graphical user interface(s) may include pictorial instructions on facial expressions mapped to controls. A verbal/written instruction to make a certain facial expression may result in different persons making different facial expressions. A pictorial instruction that shows the facial expression may result in different persons making the same facial expression. For example, a verbal/written instruction to make a left smirk may result in different people making different facial expressions, while a pictorial instruction that shows the left smirk may result in different persons making the same left smirk. Rather than require the person to decipher a verbal/written instruction to the correct facial expression, the exact facial expression to be made may be shown.

Figure 5:
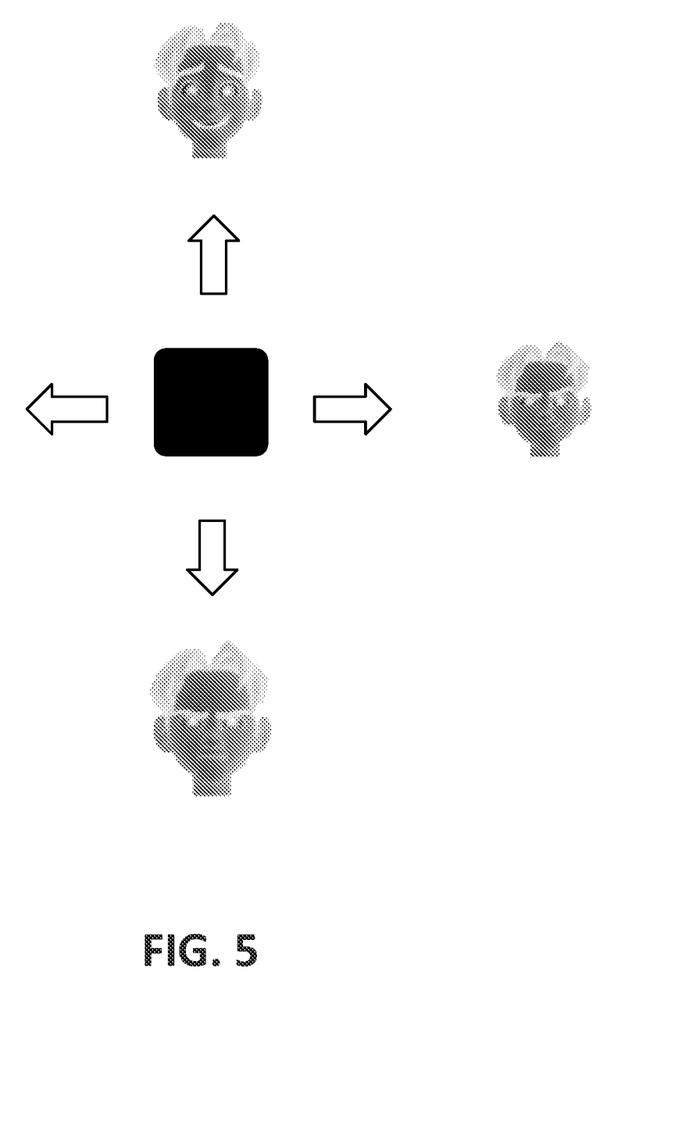
FIG. 5 illustrates an example training of the usage of facial expressions for computer control.

For example, FIG. 5 illustrates an example training of the usage of facial expressions for computer control. In FIG. 5, facial expressions for up, down, left, and right movement controls may be shown with the facial expressions mapped to the individual movement controls. Such pictorial presentation of facial expression may help the person to isolate and make facial expressions mapped to the controls. The pictorial instruction may include static images (e.g., static face sprites) or dynamic images (e.g., animated sprites). When the person makes a particular facial expression, visual feedback may be provided using one or more objects. For example, the square/cube shown in FIG. 5 may be moved/rotated in the corresponding direction.

In some implementations, audio feedback and/or haptic feedback on the values of the set of biometric characteristics and/or the activation of the set of controls may be provided. Information on the values of the biometric characteristics, whether or not the controls are activated, and/or the amount/degree of control activation may be provided audio and/or haptics. The audio feedback and/or the haptic feedback may be provided in addition to or as alternative to the visual feedback provided by the visual representations in the graphical user interface(s). The audio feedback may be provided using one or more speakers. The audio feedback may be provided via one or more sounds (e.g., words, musical note, etc.) The haptic feedback may be provided using one or more motors. The haptic feedback may be provided via one or more vibrations.

The frequency of the visual feedback, the audio feedback, and/or the haptic feedback for a given biometric characteristic may be determined based on the frequency of the given biometric characteristic and/or other information. The frequency at which the feedback is provided may be determined based on the frequency of the biometric characteristic. A range of biometric characteristic frequency may correspond to a range of feedback frequency (visual feedback frequency, audio feedback frequency, haptic feedback frequency). For example, the lowest value of the biometric characteristic frequency range may correspond to the lowest value of the feedback frequency range and the highest value of the biometric characteristic frequency range may correspond to the highest value of the feedback frequency range. The lowest value of the biometric characteristic frequency range may correspond to the highest value of the feedback frequency range and the highest value of the biometric characteristic frequency range may correspond to the lowest value of the feedback frequency range. Different frequencies/frequency ranges of the biometric characteristic may be mapped to different frequencies/frequencies ranges of the feedback. For instance, frequency bins ranging from delta brain wave to gamma brain wave may be mapped to light frequency bins (rainbow colors ROYGBIV) and/or to sound frequency bins (sub bass: 20-60 Hz, bass: 60-250 Hz, lower midrange: 250-500 Hz, midrange: 500 Hz-2 kHz, higher midrange: 2-4 kHz, presence: 4-6 kHz, brilliance: 6-20 kHz).

Such mapping of biometric characteristic frequency to feedback frequency may enable a person to understand and regulate the frequency of biometric characteristics. Such mapping of biometric characteristic frequency to feedback frequency may enable feedback via visual, audio, and/or haptic that is readily understood by a person for characteristics that are not readily understood by the person. For instance, brain waves of different frequencies may be mapped to color, sound, and/or vibration of different frequencies. Such mapping may enable visual, audio, and/or haptic feedback for brain activity. Such mapping may enable neural feedback techniques based on the frequency of brain waves. Rather than using arbitrary mapping of brain frequencies to feedback frequencies, an ordering of brain frequencies (e.g., from low to high, from high to low) may be mapped to an ordering of feedback frequencies (e.g., from low to high, from high to low). Such mapping may facilitate training of the person in using different frequencies of brain waves.

Figure 6:
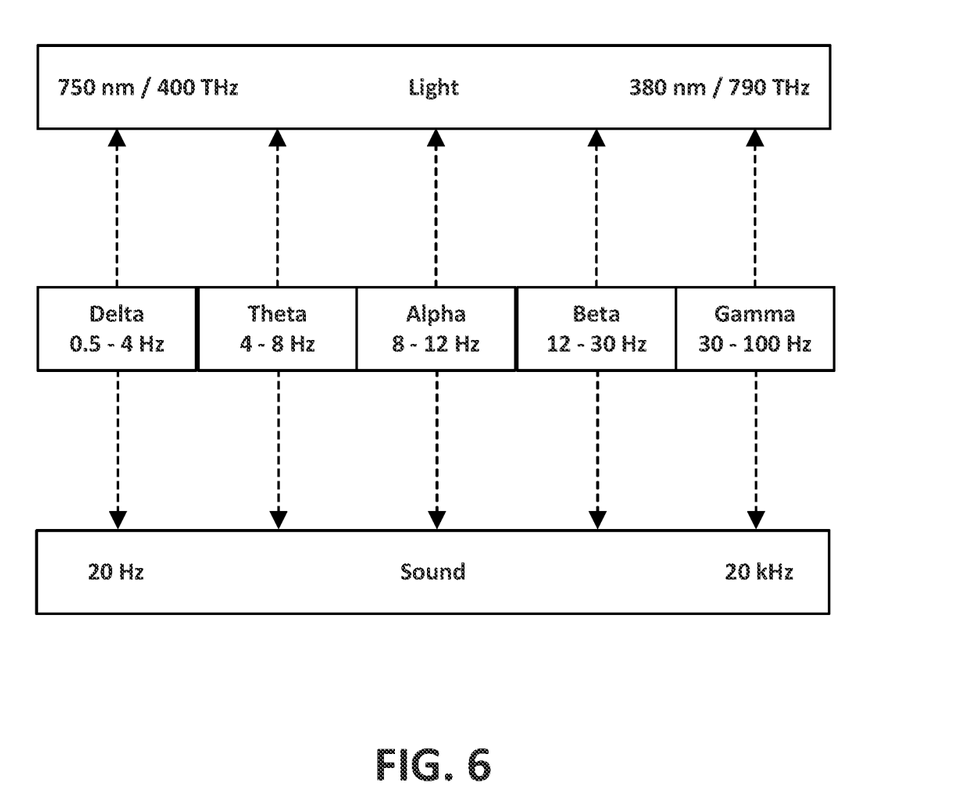
FIG. 6 illustrates an example mapping of brain frequencies to visual frequencies and audio frequencies.

FIG. 6 illustrates an example mapping of brain frequencies to visual frequencies and audio frequencies. Similar mapping of brain frequencies to haptic frequencies is contemplated. Other mapping of brain frequencies to visual frequencies, audio frequencies, haptic frequencies, and/or other feedback frequencies is contemplated.

In FIG. 6, brain frequencies may be mapped to light frequencies and sound frequencies based on relative positions of the frequencies on the frequency scale. Low frequency brain waves may be mapped to low frequency sound and low frequency light (high wavelength light), while high frequency brain waves may be mapped to high frequency sound and high frequency light (low wavelength light). Different bins of brain wave frequencies (delta; theta; alpha; beta; gamma) may be mapped to different bins of light frequencies and different bins of sound frequencies. Different bins of brain wave frequencies may correspond to different brain activities/cognitive functions (e.g., dreamless sleep; light sleep/deep relaxation; relaxed/idle state; conscious, waking state/attentiveness/alertness; learning/problem solving/information processing).

Realtime feedback for a person's brain wave activity in particular frequencies may be provided using the mapped frequencies. Feedback using the mapped frequencies may facilitate the person's understanding of different brain wave frequencies through sight, hearing, and/or touch. The amount (amplitude, energy, intensity, and/or power) of the person's brain wave activity in particular frequencies may determine the amount of the feedback provided using the mapped frequencies. For example, higher energy in the person's delta brain wave may result in higher amount of the feedback using the frequency mapped to the delta brain wave, while lower energy in the person's delta brain wave may result in lower amount of the feedback using the frequency mapped to the delta brain wave. The feedback may be provided using the frequency mapped to the brain wave type with the highest signal strength.

For instance, for visual feedback, delta, theta, alpha, beta, and gamma brain waves may be mapped to five different colors (e.g., from color with lowest frequency to color with highest frequency). Other mapping of brain wave frequencies to colors is contemplated. The different colors may help the user determine which brain wave type is most active or the relative strengths of different brain wave types. For example, the amount of particular brain wave types may be shown via the size of the differently colored bars, such as shown in the brain wave element 312 in FIG. 3. As another example, the amount of particular brain wave types may be shown via the color and/or the intensity/brightness of light being emitted from one or more virtual light sources. For example, a single light source may illuminate a virtual space. The color of light emitted by a single light source may correspond to a combination of the signal strengths of different brain wave types. Different colors mapped to different brain wave types may be blended together based on the signal strengths of the mapped brain wave types. The color of light emitted by a single light source may correspond to the brain wave type with the highest signal strength (e.g., highest amplitude, energy, intensity, or power). As another example, different light sources may emit different colors mapped to different brain wave types. The intensity/brightness with which the light sources may correspond to the signal strengths of the mapped brain wave types. The intensity/brightness with which the light sources may correspond to the relative signal strengths of the mapped brain wave types. As the signal strength of the user's brain waves changes, the illumination provided in the virtual space may change.

In some implementations, the relative signal strengths of the brain wave types may be determined by calculating the normalized relative band power strength of the brain wave types. For example, the amplitude of power in individual bands of brain wave types may be divided by the sum of the amplitude of power in all bands of brain wave types. Other determination of the relative signal strengths of the brain wave types is contemplated.

For audio feedback, delta, theta, alpha, beta, and gamma brain waves may be mapped to different musical sounds. For example, delta brain wave may be mapped to C2, the theta brain wave may be mapped to G2, alpha brain wave may be mapped to C3, beta brain wave may be mapped to G3 and D4, and gamma brain wave may be mapped to B3 and G4. Other mapping of brain wave frequencies to musical sounds is contemplated. The musical sounds for mapping to different brain wave types may be selected to form a chord. The musical sounds for mapping to different brain wave types may be selected from notes in the same musical key. The musical sounds for mapping to different brain wave types may be selected so that playing all the music sounds will result in euphony rather than cacophony. The volume/power of the musical sound that is played may correspond to the signal strengths of the mapped brain wave types. The volume/power of the musical sound that is played may correspond to the relative signal strengths of the mapped brain wave types. The dominant sound may correspond to the brain wave type with the highest signal strength. In some implementations, sounds/melodies may be played based on one or more specific combinations of brain wave types being achieved and/or sustained (e.g., for a threshold duration of time).

For haptic feedback, delta, theta, alpha, beta, and gamma brain waves may be mapped to different frequencies of vibration (e.g., from vibration with smallest frequencies to vibration with highest frequency). Other mapping of brain wave frequencies to vibrations is contemplated. Vibrations of different frequencies may be provided to the user to indicate the signal strengths of different brain wave types. The intensity of the vibration in different frequencies may correspond to the signal strengths of the mapped brain wave types. Vibration may be provided only in the frequency for the brain wave type with the highest signal strength. Vibration may be provided in multiple frequencies, with the intensities of the vibration corresponding to signal strengths of the mapped brain wave types.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) computer-readable storage medium may include read-only memory, random access memory, magnetic disk storage media, optical storage media, flash memory devices, and others, and a machine-readable transmission medium may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the electronic display 14 15 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, and the electronic display 14 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
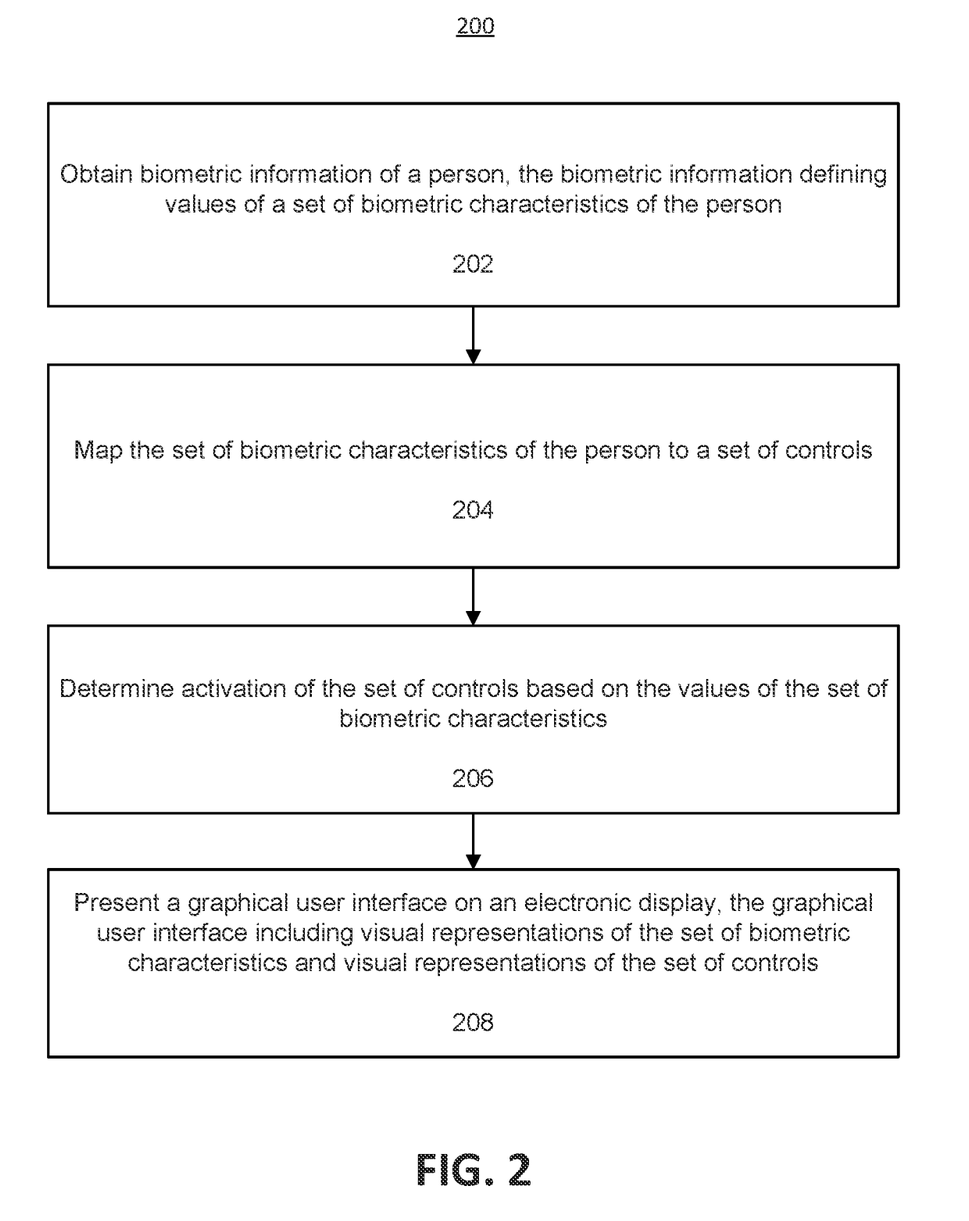
FIG. 2 illustrates an example method for facilitating computer control through biometric input.

FIG. 2 illustrates an example method for facilitating computer control through biometric input. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

At operation 202, biometric information of a person and/or other information may be obtained. The biometric information may define values of a set of biometric characteristics of the person. The set of biometric characteristics may include a first biometric characteristic, a second biometric characteristic different from the first biometric characteristic, and/or other biometric characteristics. In some implementations, operation 202 may be performed by a processor component the same as or similar to the biometric information component 102 (Shown in FIG. 1 and described herein).

At operation 204, the set of biometric characteristics of the person may be mapped to a set of controls. The set of controls may include a first control, a second control different from the first control, and/or other controls. The first biometric characteristic may be mapped to the first control. The second biometric characteristic may be mapped to the second control. In some implementations, operation 202 may be performed by a processor component the same as or similar to the map component 104 (Shown in FIG. 1 and described herein).

At operation 206, activation of the set of controls may be determined based on the values of the set of biometric characteristics and/or other information. Activation of the first control may be determined based on values of the first biometric characteristic and/or other information. Activation of the second control may be determined based on values of the second biometric characteristic and/or other information. In some implementations, operation 262 may be performed by a processor component the same as or similar to the activation component 106 (Shown in FIG. 1 and described herein).

At operation 208, a graphical user interface may be presented on an electronic display. The graphical user interface may include visual representations of the set of biometric characteristics, visual representations of the set of controls, and/or other visual representations. The visual representations of the set of biometric characteristics may provide visual feedback on the values of the set of biometric characteristics. The visual representations of the set of controls may provide visual feedback on the activation of the set of controls. In some implementations, operation 262 may be performed by a processor component the same as or similar to the graphical user interface component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for facilitating computer control through biometric input, the system comprising:
    one or more physical processors configured by machine-readable instructions to:
        obtain biometric information of a person, the biometric information defining values of a set of biometric characteristics of the person, the set of biometric characteristics including facial expressions of the person, the facial expressions of the person including a first facial expression and a second facial expression different from the first facial expression;
        map the set of biometric characteristics of the person to a set of controls, the set of controls including a first control and a second control different from the first control, wherein the first facial expression is mapped to the first control and the second facial expression is mapped to the second control;
        determine activation of the set of controls based on the values of the set of biometric characteristics, wherein activation of the first control is determined based on values of the first facial expression indicating whether or not the person has made the first facial expression and activation of the second control is determined based on values of the second facial expression indicating whether or not the person has made the second facial expression; and
        present a graphical user interface on an electronic display, the graphical user interface including visual representations of the set of biometric characteristics and visual representations of the set of controls, the visual representations of the set of biometric characteristics providing visual feedback on the values of the set of biometric characteristics and the visual representations of the set of controls providing visual feedback on the activation of the set of controls;
    wherein:
        the set of controls to which the set of biometric characteristics is mapped include multiple directional controls, the multiple directional controls including an up control, a down control, a left control, and a right control;
        the facial expressions of the person include both brows being raised, squinting/both brows being furrowed, a left eye wink, and a right eye wink;
        the both brows being raised is mapped to the up control;
        the squinting/both brows being furrowed is mapped to the down control;
        the left eye wink is mapped to the left control; and
        the right eye wink is mapped to the right control.

2. The system of claim 1, wherein:
    the facial expressions of the person further include smiling; and
    the smiling is further mapped to the down control.

3. The system of claim 1, wherein:
    the multiple directional controls further include a diagonal up-left control, a diagonal up-right control, a diagonal down-left control, and a diagonal down-right control;
    the facial expressions of the person further include a left brow being raised, a right brow being raised, a left cheek smirk, and a right cheek smirk;
    the left brow being raised is mapped to the diagonal up-left control;
    the right brow being raised is mapped to the diagonal up-right control;
    the left cheek smirk is mapped to the diagonal down-left control; and
    the right cheek smirk is mapped to the diagonal down-right control.

4. The system of claim 3, wherein:
    the set of controls to which the set of biometric characteristics is mapped further include a selection control;
    the facial expressions of the person further include a jaw clench; and
    the jaw clench is mapped to the selection control.

5. The system of claim 4, wherein the selection control includes a button click.

6. The system of claim 3, wherein:
    the set of controls to which the set of biometric characteristics is mapped further include a selection control;
    the set of biometric characteristics further include a voltage reading from an electroencephalography sensor and a size of the person's pupil; and
    a combination of the voltage reading from the electroencephalography sensor and the size of the person's pupil is mapped to the selection control.

7. The system of claim 1, wherein the facial expressions of the person provide a binary input of the multiple directional controls.

8. The system of claim 1, wherein the facial expressions of the person provide a range input of the multiple directional controls.

9. The system of claim 1, wherein a type of the facial expressions made by the person is determined based on signals measured from facial muscles of the person.

10. The system of claim 9, wherein the type of the facial expressions made by the person is determined further based on one or more images of a head of the person.

11. The system of claim 1, wherein the graphical user interface further includes pictorial instructions on the facial expressions mapped to the set of controls, the pictorial instructions showing the facial expressions mapped to the set of controls.

12. A method for facilitating computer control through biometric input, the method performed by a computing system including one or more processors, the method comprising:
    obtaining, by the computing system, biometric information of a person, the biometric information defining values of a set of biometric characteristics of the person, the set of biometric characteristics including facial expressions of the person, the facial expressions of the person including a first facial expression and a second facial expression different from the first facial expression;
    mapping, by the computing system, the set of biometric characteristics of the person to a set of controls, the set of controls including a first control and a second control different from the first control, wherein the first facial expression is mapped to the first control and the second facial expression is mapped to the second control;

determining, by the computing system, activation of the set of controls based on the values of the set of biometric characteristics, wherein activation of the first control is determined based on values of the first facial expression indicating whether or not the person has made the first facial expression and activation of the second control is determined based on values of the second facial expression indicating whether or not the person has made the second facial expression; and presenting, by the computing system, a graphical user interface on an electronic display, the graphical user interface including visual representations of the set of biometric characteristics and visual representations of the set of controls, the visual representations of the set of biometric characteristics providing visual feedback on the values of the set of biometric characteristics and the visual representations of the set of controls providing visual feedback on the activation of the set of controls;

wherein:
the set of controls to which the set of biometric characteristics is mapped include multiple directional controls, the multiple directional controls including an up control, a down control, a left control, and a right control;
the facial expressions of the person include both brows being raised, squinting/both brows being furrowed, a left eye wink, and a right eye wink;
the both brows being raised is mapped to the up control;
the squinting/both brows being furrowed is mapped to the down control;
the left eye wink is mapped to the left control; and
the right eye wink is mapped to the right control.

13. The method of claim 12, wherein:
the facial expressions of the person further include smiling; and
the smiling is further mapped to the down control.

14. The method of claim 12, wherein:
the multiple directional controls further include a diagonal up-left control, a diagonal up-right control, a diagonal down-left control, and a diagonal down-right control;
the facial expressions of the person further include a left brow being raised, a right brow being raised, a left cheek smirk, and a right cheek smirk;
the left brow being raised is mapped to the diagonal up-left control;
the right brow being raised is mapped to the diagonal up-right control;
the left cheek smirk is mapped to the diagonal down-left control; and
the right cheek smirk is mapped to the diagonal down-right control.

15. The method of claim 14, wherein:
the set of controls to which the set of biometric characteristics is mapped further include a selection control;
the facial expressions of the person further include a jaw clench; and
the jaw clench is mapped to the selection control.

16. The method of claim 15, wherein the selection control includes a button click.

17. The method of claim 14, wherein:
the set of controls to which the set of biometric characteristics is mapped further include a selection control;
the set of biometric characteristics further include a voltage reading from an electroencephalography sensor and a size of the person's pupil; and
a combination of the voltage reading from the electroencephalography sensor and the size of the person's pupil is mapped to the selection control.

18. The method of claim 12, wherein the facial expressions of the person provide a binary input of the multiple directional controls.

19. The method of claim 12, wherein the facial expressions of the person provide a range input of the multiple directional controls.

20. The method of claim 12, wherein a type of the facial expressions made by the person is determined based on signals measured from facial muscles of the person.

21. The method of claim 20, wherein the type of the facial expressions made by the person is determined further based on one or more images of a head of the person.

22. The method of claim 12, wherein the graphical user interface further includes pictorial instructions on the facial expressions mapped to the set of controls, the pictorial instructions showing the facial expressions mapped to the set of controls.

* * * * *